United States Patent
Liu et al.

(10) Patent No.: US 9,215,607 B2
(45) Date of Patent: Dec. 15, 2015

(54) MAIN/STANDBY SWITCHING INTERFACE MODULE, NETWORK ELEMENT SYSTEM, AND LINK INFORMATION SYNCHRONIZATION DETECTION METHOD

(75) Inventors: Heyang Liu, Shenzhen (CN); Shubo Guo, Shenzhen (CN); Meifeng Zhang, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 34 days.

(21) Appl. No.: 13/382,578
(22) PCT Filed: May 19, 2010
(86) PCT No.: PCT/CN2010/072915
§ 371 (c)(1),
(2), (4) Date: Jan. 6, 2012
(87) PCT Pub. No.: WO2011/009324
PCT Pub. Date: Jan. 27, 2011

(65) Prior Publication Data
US 2012/0106545 A1    May 3, 2012

(30) Foreign Application Priority Data
Jul. 24, 2009 (CN) .......................... 2009 1 0089821

(51) Int. Cl.
*H04W 24/04* (2009.01)
*H04W 56/00* (2009.01)
*H04W 52/00* (2009.01)
*H04L 12/50* (2006.01)
*H04L 12/723* (2013.01)
*H04L 12/933* (2013.01)
(Continued)

(52) U.S. Cl.
CPC ...................................... *H04W 24/04* (2013.01)

(58) Field of Classification Search
CPC .............................. H04L 45/00; H04W 24/04
USPC ................. 370/352–360, 362, 369–372, 375, 370/386–389
See application file for complete search history.

(56) References Cited

U.S. PATENT DOCUMENTS 6,427,213 B1 * 7/2002 Dao ................................. 714/12
6,983,294 B2 * 1/2006 Jones et al. ........................... 1/1
(Continued)

FOREIGN PATENT DOCUMENTS

| CN | 1610898 A | 4/2005 |
| CN | 1917675 A | 2/2007 |

(Continued)

OTHER PUBLICATIONS

International Search Report for PCT/CN2010/072915, English translation attached to original, Both completed by the Chinese Patent Office on Jul. 15, 2010, 8 pages all together.

*Primary Examiner* — Un C Ho
*Assistant Examiner* — Peian Lou
(74) *Attorney, Agent, or Firm* — Brooks Kushman P.C.

(57) ABSTRACT

The present invention discloses an active and standby switching interface module, a network element system and a method for synchronizing and detecting link information. In the scheme of the present invention, the standby switching function interface module sends a synchronization detection request message to a synchronization module, and performs synchronization processing on the link information on the standby switching function interface module according to a synchronization detection reply message from the synchronization module, wherein the synchronization detection reply message encapsulates the link information on the active switching function interface module. The scheme provided by the present invention effectively performs the synchronization and consistent detection on the link information, thereby correctly switch the data on the active switching function interface module to the link of the standby switching function interface module when the active switching function interface module is required to perform the active and standby switching.

16 Claims, 2 Drawing Sheets (51) Int. Cl.
*G06F 11/16* (2006.01)
*G06F 11/20* (2006.01)

(56) References Cited

U.S. PATENT DOCUMENTS 7,490,161 B2 * 2/2009 Ren ............................... 709/238

2007/0162565 A1 * 7/2007 Hanselmann .................. 709/219
2008/0211659 A1 * 9/2008 Lee et al. ...................... 340/506

FOREIGN PATENT DOCUMENTS

| CN | 101621819 A | 1/2010 |
| EP | 1361689 A1 | 11/2003 |

* cited by examiner

FIG. 1

Prior Art

MAIN/STANDBY SWITCHING INTERFACE MODULE, NETWORK ELEMENT SYSTEM, AND LINK INFORMATION SYNCHRONIZATION DETECTION METHOD

TECHNICAL FIELD

The present invention relates to the 3rd Generation (3G) communication field, and especially, to an active and standby switching interface module, a network element system and a method for synchronizing and detecting link information.

BACKGROUND OF THE RELATED ART

With the development of the network communication technique and the large-scale commercialization of the 3G technique, the user puts forward a higher requirement for high reliability and real time of the service, and at the meantime, the high reliability is the basic requirement of the carrier-class equipment and the basic starting point of the telecommunication operators. The standard organizations all provide solutions of the link quick switching/backup at the control plane for the 3G network control protocol, however, there is not a specific solution mentioned for the quick switching of the forwarding path (hereinafter referred as "the bearer link at the user plane") between the external interface and the user plane.

Figure 1:
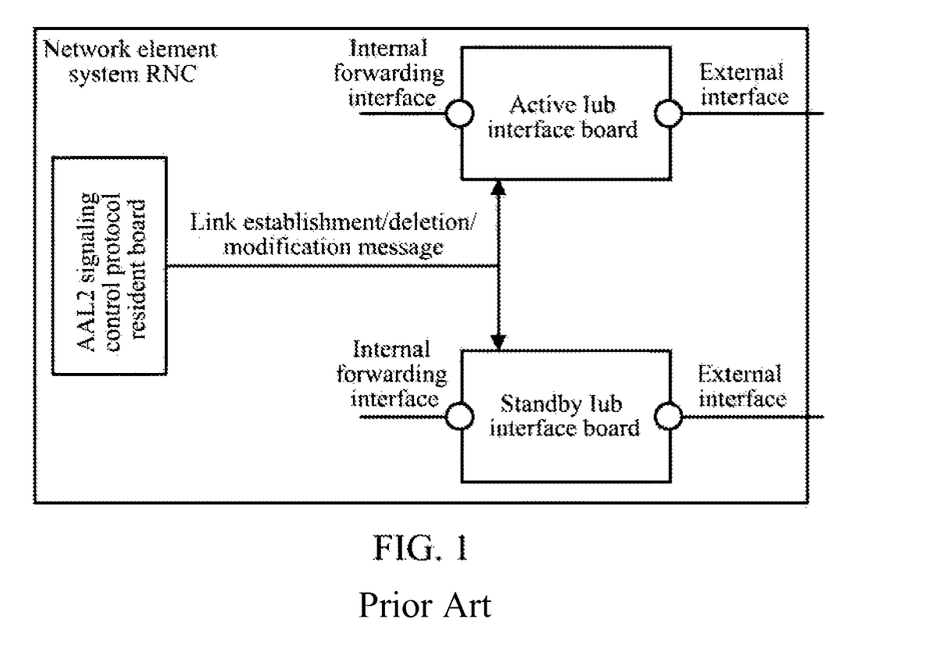
FIG. 1 is a structural schematic diagram of the network element system RNC in the related art.

The Iub interface of the network element system Radio Network Controller (RNC) is taken as an example. As shown in FIG. 1, the RNC comprises an ATM Adaptation Layer Type 2 (AAL2) signaling control protocol resident board, an active Iub interface board, a standby Iub interface board and a plurality of physical ports, wherein the AAL2 signaling control protocol resident board notifies the active Iub interface board and the standby Iub interface board to establish/delete/modify the bearer link, and the active Iub interface board and the standby Iub interface board support the active and standby switching function of the board.

At present, the high reliability of the Iub interface board is actively ensured by port protection or a backup between the active Iub interface board and the standby Iub interface board, wherein the port protection comprises protection implemented by internal ports and protection implemented between the external interfaces. However, the protection and backups are the protection only among the physical ports, physical links or boards, but there is not the protection performed for the bearer link at the user plane.

Actually, for the bearer link at the user plane, in the network element system RNC shown in FIG. 1, the AAL2 signaling control protocol resident board simultaneously sends the link establishment/deletion/modification message to the active Iub interface board and the standby Iub interface board, and the active Iub interface board and the standby Iub interface board will respectively establish/delete/modify the bearer link on the local board after receiving the link establishment/deletion/modification message, thereby being able to switch the data stream at the user plane on the active Iub interface board to the bearer link on the standby Iub interface board when the active and standby switching occurs in the active Iub interface board and the standby Iub interface board due to the causes such as the active Iub interface board failure or manual operations and so on.

However, due to the causes such as the continuous access and exit of the user, the restarting and replacement of the standby Iub interface board, the message loss and link operation failure of the AAL2 signaling control protocol resident board and so on, the inconformity of information on the active Iub interface board and the standby Iub interface board might be caused, for example: a link redundancy, a link deficiency or parameter incorrectness on the standby Iub interface board. Therefore, after switching the active Iub interface board and the standby Iub interface board, there may occur problems that: (1) the user is off-line on account of the inconformity of the bearer links on the active Iub interface board and the standby Iub interface board; (2) the replacement and upgrade of the active Iub interface board and the standby Iub interface board are unable to be supported and so on.

Due to the existence of the above problems, the user plane processing cannot perform the traffic control exactly after the standby Iub interface board becoming as the active Iub interface board, which will reduce the access capability or result in a traffic burst, thereby data at the user plane born on the interface board being unable to be forwarded correctly and the service of the on-line user can not be ensured.

SUMMARY OF THE INVENTION

In consideration of the above, the main object of the present invention is to provide an active and standby switching interface module, a network element system, and a method for synchronizing and detecting link information, so as to implement the synchronization of the link information between the active and standby switching interface modules.

In order to solve the above technical problems, the technical scheme of the present invention is implemented as follows.

An active and standby switching interface module, which is located in a network element system, comprises: an active interface module and a standby interface module, wherein when the active and standby switching interface module is used as an active switching function interface module, the active interface module is configured to: directly establish/delete/modify link information according to a link establishment/deletion/modification message that is received;

when the active and standby switching interface module is used as a standby switching function interface module, the standby interface module is configured to: send a synchronization detection request message to a synchronization module, and perform synchronization processing on the link information on the standby interface module according to a synchronization detection reply message from the synchronization module, wherein the synchronization detection reply message encapsulates the link information on the active switching function interface module.

The synchronization module is: the active interface module in the active and standby switching interface module used as the active switching function interface module; or, a control module in the network element system and the control module saving link information same with the link information in the active switching function interface module.

The active interface module comprises:

a first message generation unit, which is configured to: generate a synchronization detection reply message according to the synchronization detection request message received from the standby switching function interface module, and send the synchronization detection reply message to the standby switching function interface module, wherein the synchronization detection reply message encapsulates the link information on the active interface module.

The active interface module further comprises:

a first link information processing unit, which is configured to: directly establish/delete/modify the link information according to the link establishment/deletion/modification message that is received.

The standby interface module comprises:

a second message generation unit, which is configured to: send the synchronization detection request message to the synchronization module; and a link information processing unit, which is configured to: perform the synchronization processing on the link information on the standby interface module according to the synchronization detection reply message from the synchronization module.

The second link information processing unit is further configured to: delete the link information that is not synchronized and detected on the standby interface module; and/or, the second message generation unit is further configured to: generate a synchronization detection acknowledgement message and send the synchronization detection acknowledgement message to the synchronization module after receiving the synchronization detection reply message.

The second link information processing unit is further configured to: determine whether to establish/delete/modify the link information on the standby interface module according to a synchronization detection state of the link information on the standby interface module and a type of a received message.

A message interacted between the standby interface module and the synchronization module includes a synchronization serial number and a message serial number, wherein when any one of the synchronization serial number and the message serial number included in the message received from the synchronization module is not an expected serial number, the standby interface module does not process the message, and waits for the synchronization module resending the message; or, the standby interface module resends a message including an expected synchronization serial number and message serial number to the synchronization module.

A network element system comprises: one active switching function interface module and at least one standby switching function interface module, wherein the standby switching function interface module is configured to: send a synchronization detection request message to a synchronization module, and perform synchronization processing on link information on the standby switching function interface module according to a synchronization detection reply message from a synchronization module, wherein the synchronization detection reply message encapsulates the link information on the active switching function interface module.

The synchronization module is the active switching function interface module; or, a control module in the network element system and the control module saving link information same with the active switching function interface module.

The control module is further configured to: send a link establishment/deletion/modification message to the active switching function interface module and the standby switching function interface module;

the active switching function interface module is further configured to: directly establish/delete/modify the link information according to the link establishment/deletion/modification message that is received;

the standby switching function interface module is further configured to: determine whether to establish/delete/modify the link information according to a type of a message received from the control module and a synchronization detection state of the link information on the standby switching function interface module.

The standby switching function interface module is further configured to:

generate a synchronization detection acknowledgement message and send the synchronization detection acknowledgement message to the synchronization module after receiving the synchronization detection reply message; and/or delete the link information that is not synchronized and detected on the standby switching function interface module; and/or a message interacted with the synchronization module includes a synchronization serial number and a message serial number, wherein when any one of the synchronization serial number and the message serial number included in the message received from the synchronization module is not an expected serial number, the standby switching function interface module does not process the message, and waits for the synchronization module resending the message; or, the standby switching function interface module resends a message including an expected synchronization serial number and message serial number to the synchronization module.

A method for synchronizing and detecting link information is used for a standby switching function interface module in a network element system synchronizing and detecting the link information, and the method comprises:

the standby switching function interface module sending a synchronization detection request message to a synchronization module, and performing synchronization processing on link information on the standby switching function interface module according to a synchronization detection reply message from the synchronization module, wherein the synchronization detection reply message encapsulates the link information on an active switching function interface module.

The synchronization module is the active switching function interface module; or, a control module in the network element system and the control module saving link information same with the active switching function interface module.

After performing the synchronization processing on the link information on the standby switching function interface module according to the synchronization detection reply message, the method further comprises:

the standby switching function interface module deleting the link information that is not synchronized and detected on the standby switching function interface module; and/or, the standby switching function interface module generating a synchronization detection acknowledgement message and sending the synchronization detection acknowledgement message to the synchronization module.

The method further comprises:

the control module sending a link establishment/deletion/modification message to the active switching function interface module and the standby switching function interface module;

the active switching function interface module directly establishing/deleting/modifying the link information according to the link establishment/deletion/modification message that is received; and the standby switching function interface module determining whether to establish/delete/modify the link information according to a type of a message from the control module and a synchronization detection state of the link information on the standby switching function interface module.

The step of determining whether to establish/delete/modify the link information according to the type of the message from the control module and the synchronization detection state of the link information on the standby switching function interface module comprises:

if the message received from the control module is the link establishment message, the standby switching function interface module directly establishing new link information according to the link establishment message, and marking the established new link information as a newly established link information, and when the standby switching function interface module receives the synchronization detection reply message, not processing the newly established link information; or, if the message received from the control module is a link deletion/modification message, the standby switching function interface module judging whether the link message to be deleted or modified has been synchronized and detected, if the link message to be deleted or modified has been synchronized and detected, then deleting or modifying the link information, otherwise, the standby switching function interface module caching the link deletion/modification message into a message queue, and after completing to synchronize and detect link information, if the link information included in the link deletion/modification message cached in the message queue is the link information that has been synchronized and detected, then deleting and modifying the link information.

The method further comprises: a message interacted between the standby switching function interface module and the synchronization module including a synchronization serial number and a message serial number, wherein when any one of the synchronization serial number and the message serial number included in the message that is received is not an expected serial number, the standby switching function interface module does not process the message, and waits for the synchronization module resending the message; or, the standby switching function interface module resends a message including an expected synchronization serial number and message serial number to the synchronization module.

The examples of the present invention have the following beneficial effects:

The synchronization and conformity detection of the link information can be effectively performed by means of synchronizing and detecting the link information between the active switching function interface module and the standby switching function interface module, thereby correctly switch the data on the active switching function interface module to the link of the standby switching function interface module when the active switching function interface module is required to perform the active and standby switching due to problems such as the failure and so on. As the consistency of the link information between the active switching function interface module and the standby switching function interface module is maintained, operations such as the replacement, and the upgrade of software and hardware and the like can be performed for anyone of the active switching function interface module and the standby switching function interface module, while the another one can still support the service of the on-line users and the access of the new users. In addition, since the synchronization and detection are completed within one procedure, the operation procedure is simplified and the system load is reduced.

Further, the consistency of the link information between the active switching function interface module and the standby switching function interface module can be implemented in real time and more effectively by means of distinguishingly performing the processing in the procedure of synchronizing and detecting the link information in real time according to the messages from the control module, and it can be prevented that the old link information replaces the new link information.

Besides, adding the synchronization serial number and the message serial number to the message interacted between the active switching function interface module and the standby switching function interface module can further prevent the disorder from occurring in the procedure of synchronizing and detecting the link information, and further avoid the occurrence of the case of the new link information replaces the old link information.

PREFERRED EMBODIMENTS OF THE PRESENT INVENTION

The present invention is illustrated in detail with reference to drawings in the following.

Figure 2:
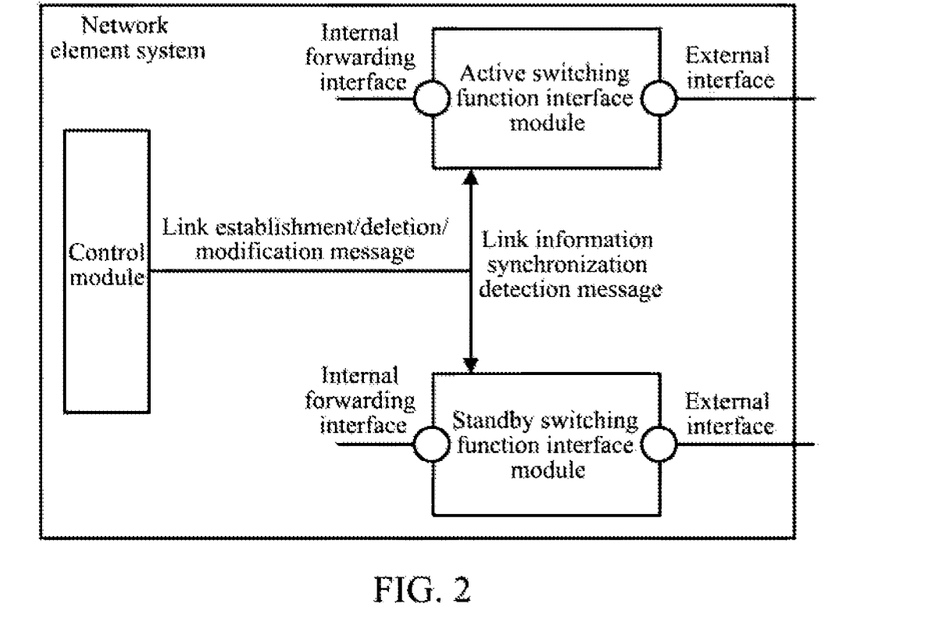
FIG. 2 is a structural schematic diagram of the network element system according to the present invention.

In order to implement the seamless switching of the bearer link at the user plane to make the service uninterrupted, the present invention provides a network element system supporting the function of active and standby switching. FIG. 2 is a structural schematic diagram of the network element system according to the present invention. As shown in FIG. 2, the network element system in the present invention comprises: a control module and at least two active and standby switching interface modules supporting the function of active and standby switching, one of the at least two active and standby switching interface modules is an active switching function interface module and the others are the standby switching function interface modules, namely, the network element system comprises one active switching function interface module and at least one standby switching function interface module. In order to facilitate the description, two active and standby switching interface modules comprised in the network element system is taken as an example.

The control module is used to simultaneously send link establishment/deletion/modification message to the active switching function interface module and the standby switching function interface module in real time, and, can be further used to perform the procedure of synchronizing and detecting the link information between the active switching function interface module and the standby switching function interface module (which further comprises the procedure of synchronizing and detecting the link information among three modules of each active and standby switching interface module and the control module). Specifically, if the control module itself saves the same link information with the active switching function interface module, then the control module generates a synchronization detection reply message according to the synchronization detection request message received from the standby switching function interface module, and sends the synchronization detection reply message to the standby switching function interface module, wherein the synchronization detection reply message encapsulates the link information on the active switching function interface module. The active switching function interface module is used to directly establish/delete/modify the own bearer link after receiving the link establishment/deletion/modification message, and the standby switching function interface module is used to perform corresponding processing according to the state of own link information after receiving the link establishment/deletion/modification message. The active switching function interface module is further used to generate the synchronization detection reply message according to the synchronization detection request message received from the standby switching function interface module, and send the synchronization detection reply message to the standby switching function interface module, wherein the synchronization detection reply message encapsulates the link information on the active switching function interface module. The standby switching function interface module is used to send the synchronization detection request message to the active switching function interface module or the control module, and performs the synchronization processing on the link information on the standby switching function interface module according the synchronization detection reply message from the active switching function interface module or the control module. Finally, the consistency of the link information of the active switching function interface module and the standby switching function interface module is maintained.

In order to be switched from carrying out the function of the active interface module to carrying out the function of the standby interface module during the active and standby switching or to be switched from carrying out the function of the standby interface module to carrying out the function of the active interface module during the active and standby switching, each active and standby interface module shall have the same structure and all comprise the function of the active interface module and the function of the standby interface module.

Figure 3:
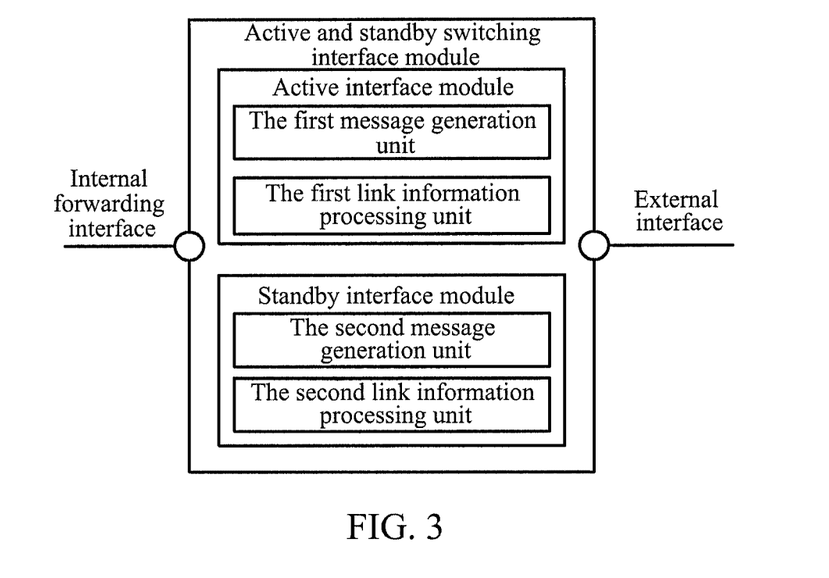
FIG. 3 is a structural schematic diagram of the active and standby switching interface module according to the present invention.

FIG. 3 is a structural schematic diagram of the active and standby switching interface module according to the present invention. As shown in FIG. 3, the active and standby switching interface module is located in the network element system, and comprises the active interface module and the standby interface module. When the active and standby switching interface module is used as the active switching function interface module, the active interface module is used to generate the synchronization detection reply message according to the synchronization detection request message received from the standby switching function interface module, and send the synchronization detection reply message to the standby switching function interface module, wherein the synchronization detection reply message encapsulates the link information on the active interface module; when the active and standby switching interface module is used as the standby switching function interface module, the standby interface module is used to send the synchronization detection request message to the active switching function interface module, and perform the synchronization processing on the link information on the standby interface module according to the synchronization detection reply message received from the active switching function interface module, so as to make the link information on the main switching interface module synchronization with the link information on the standby switching interface module.

Further, the active interface comprises: the first message generation unit and the first link information processing unit, wherein when the active and standby switching interface module is used as the active switching function interface module, the first message generation unit is used to: generate the synchronization detection reply message according to the synchronization detection request message received from the standby switching function interface module, and send the synchronization detection reply message to the standby switching function interface module, wherein the synchronization detection reply message encapsulates the link information on the active interface module; and the first link information processing unit is used to: directly establish/delete/modify the link information according to the link establishment/deletion/modification message received from the control module in the network element system.

The standby interface module comprises: the second message generation unit and the second link information processing unit, wherein when the active and standby switching interface module is used as the standby switching function interface module, the second message generation unit is used to send the synchronization detection request message to the active switching function interface module; specifically, the second message generation unit sends the synchronization detection request message to the active switching function interface module when a start message is received by the second message generation unit or the synchronization detection timer is time out;

the second message generation unit is used to delete or modify the link information on the standby interface module according to the synchronization detection reply message received from the active switching function interface module so as to make the link information on the active switching interface module synchronous with the link information on the standby switching interface module.

Besides, the second message generation unit can be further used to generate and then send the synchronization detection acknowledgement message to the active switching function interface module after receiving the synchronization detection reply message sent by the active switching function interface module.

Besides, the second link information processing unit can be further used to delete the link information that is not synchronized and detected on the standby interface module so as to save the bandwidth after synchronizing all the link information of the second link information processing unit with that of the active switching function interface module.

Besides, the second link information processing unit is further used to determine whether to establish/delete/modify the link information on the standby interface module according to the type of the message from the control module in the network element system and the state of the synchronization and detection of the link information on the standby interface module.

Specifically, when the message from the control module received by the second link information processing unit is the link establishment message, the second link information processing unit directly establishes the link information according to the link establishment message, and marks the established link information as the newly established link information; for the newly established link information, when receiving the synchronization detection reply message from the active switching function interface module, the second link information processing unit does not processes the newly established link information; only in subsequent synchronization and detection of the link information, the second link information processing unit will process the previously newly established link information according to the synchronization detection reply message of the active switching function interface module. When the message from the control module is the link deletion/modification message, the second link information processing unit judges whether the link information to be deleted/modified has been synchronized and detected, if it has been synchronized and detected, then the second link information processing unit deletes or modifies the link information according to the link deletion/modification message, if it hasn't been synchronized and detected, then caches the link deletion/modification message into the message queue, and after completing to synchronize and detect the link information, if the link information included in the link deletion/modification message cached in the message queue is the link information that has been synchronized and detected, then the second link information processing unit deletes or modifies the link information according to the link deletion/modification message.

The consistency of the link information between the active switching function interface module and the standby switching function interface module can be implemented real time and more effectively and the old link information replacing the new link information can be prevented by means of establishing/deleting/modifying the link information according to the type of the message from the control module in the network element system and the state of the synchronization and detection of the link information on the standby interface module.

If the control module itself saves the same link information with the active switching function interface module, then the standby interface module can also complete the link information synchronization and detection via the interaction with the control module.

Further, the message interacted between the active switching function interface module and the standby switching function interface module includes the synchronization serial number and the message serial number. When any one of the synchronization serial number and the message serial number included in the message received from the active switching function interface module is not the expected serial number, the second link information processing unit will not process the message, but will wait for the active switching function interface module resending the message for example the synchronization detection reply message; or, the second link information processing unit sends the message including the expected synchronization serial number and message serial number to the active switching function interface module, for example the synchronization detection request message and the synchronization detection acknowledgement message, thereby ensuring the reliability and the order preservation of the message.

Figure 4:
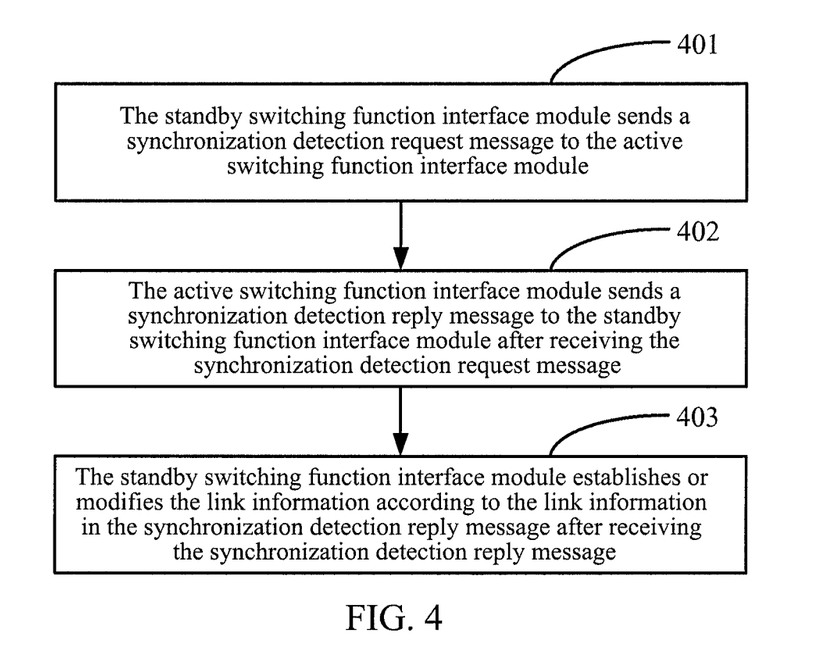
FIG. 4 is a flowchart of synchronizing and detecting the link information according to the present invention.

In order to implement to synchronize and detect the link information between the active switching function interface module and the standby switching function interface module according to the message from the control module in real time, and then to implement the seamless switching of the bearer link at the user plane to make the service uninterrupted, the present invention provides a method for synchronizing and detecting link information, which used for synchronizing and detecting the link information between the active switching function interface module and the standby switching function interface module. FIG. 4 is a flowchart of synchronizing and detecting the link information according to the present invention, and as shown in FIG. 4, the method for synchronizing and detecting link information comprises the following steps.

Step 401, the standby switching function interface module sends the synchronization detection request message to the active switching function interface module.

Specifically, when the standby switching function interface module starts and receives the start message for example the power up signal, it will send the synchronization detection request message to the active switching function interface module; or, when the synchronization detection timer on the standby switching function interface module is time out, the standby switching function interface module will also send the synchronization detection request message to the active switching function interface module.

Step 402, the active switching function interface module sends the synchronization detection reply message to the standby switching function interface module after receiving the synchronization detection request message, and the synchronization detection reply message encapsulates the link information on the active switching function interface module.

Step 403, the standby switching function interface module detects the link information on the standby interface module according to the link information in the synchronization detection reply message after receiving the synchronization detection reply message, and modifies or establishes the link information to synchronize the link information on the standby switching function interface module with the link information on the active switching function interface module.

Further, the standby switching function interface module can return the synchronization detection acknowledgement message to the active switching function interface module to denote that the link information synchronization and detection have been completed. Understandably, this step is not necessary in the link information synchronization and detection of the present invention.

Further, when all the link information on the active switching function interface module cannot be sent to the standby switching function interface module in a lump based on the synchronization detection reply message in step 402, then steps 401 to 403 are repeated until all the link information on the active switching function interface module is synchronized and detected. Further, in this case, the standby switching function interface module can send the synchronization detection acknowledgement message for denoting that all the link information having been synchronized and detected to the active switching function interface module.

Further, in order to save the bandwidth, the standby switching function interface module can further detect the link information that is undetected on the present standby switching function interface module and can delete the redundant link information.

Due to the existence of the user's continuous access and off-line, the active switching function interface module and the standby switching function interface module will continuously receive the message from the control module in the procedure of synchronizing and detecting the link information. In order to not affect the access of the new user and not waste the bandwidth, the standby switching function interface module will further distinguishingly perform the processing on the message from the control module in the procedure of synchronizing and detecting the link information, which specifically as follows.

1. If the message received from the control module is the link establishment message, the standby switching function interface module directly establishes the new link information according to the link establishment message, and then marks the established new link information as the newly established link information. For the newly established link information established according to the link establishment message, when receiving the synchronization detection reply message of the active switching function interface module, the standby switching function interface module will not process the newly established link message. The standby switching function interface module will process the previously newly established link information according to the synchronization detection reply message of the active switching function interface module only in the subsequent link information synchronization and detection.

2. If the message received from the control module is the link deletion/modification message, the standby switching function interface module shall judge whether the link message to be deleted or modified has been performed synchronized and detected, if it has been synchronized and detected, then the link information is deleted or modified according to the link deletion/modification message, otherwise, the standby switching function interface module will cache the link deletion/modification message into the message queue, and after completing to synchronize and detect link information, if the link information included in the link deletion/modification message cached in the message queue is the link information that has been synchronized and detected, then the link information is deleted or modified according to the link deletion/modification message.

In addition, since the message in the distributed system has unreliability and disorderliness, if the standby switching function interface module in the present procedure of synchronizing and detecting the link information receives the synchronization detection reply message of the last procedure of synchronizing and detecting the link information synchronous detection, then a case of the old link information replacing the new link information will happen. In order to ensure the reliability and the order preservation so as to avoid this kind of problems, the way of combining the synchronization serial number and the message serial number can be used to perform synchronization and detection.

The synchronization serial number is the serial number set with respect to the procedure of synchronizing and detecting the link information at this time when the standby switching function interface module initiates the synchronization detection request message, all the messages use this serial number in the procedure of synchronizing and detecting the link information at this time, and if the message that both of the active switching function interface module and the standby switching function interface module receive is not the message with this serial number, then no processing is performed, thereby being able to avoid the message disorder in the procedures of synchronizing and detecting link information at different times.

The message serial number is set with respect to once procedure of reply ("request- reply", "request-reply-acknowledgement" in the case of sending the synchronization detection acknowledgement message) between the active switching function interface module and the standby switching function interface module, and each message includes the same one message serial number in the same procedure of reply. For the next procedure of reply, the message serial number preferably is successive to the message serial number at the last time in order to ensure the continuity of the procedure of synchronizing and detecting the link information. Certainly, it is not excluded that other ways are used to denote the message serial number to distinguish the reply procedure of the same one or different procedures of synchronizing and detecting the link information.

That is to say, the standby switching function interface module first sends the synchronization detection request message which includes the synchronization serial number in the present procedure of synchronizing and detecting the link information and the message serial number in the present procedure of the reply in the same one procedure of synchronizing and detecting the link information. The active switching function interface module sends the synchronization detection reply message using the synchronization serial number and the message serial number after receiving the synchronization detection request message. Further, the standby switching function interface module can also send the synchronization detection acknowledgement message using the same synchronization serial number and message serial number after receiving the synchronization detection reply message,.

When any one of the synchronization serial number and the message serial number included in the received message is not the expected serial number, the active switching function interface module will not process the message, but will wait for the standby switching function interface module resending the message. When the standby switching function interface module cannot receive the message or the serial number of the received message is not the expected serial number, then the standby switching function interface module discards the message without processing, and resends the synchronization detection acknowledgement message or the synchronization detection request message and includes the expected synchronization serial number and message serial number.

The above examples illustrates the standby switching function interface module sending a request to the active switching function interface module to acquire the link information that requires synchronizing and detecting, but what can be understood is that the standby switching function interface module can send request to other entities which are used as the link information data source and save the link information that requires synchronizing and detecting to acquire the link information that requires synchronizing and detecting, and the entities can update own link information according to the link information in the active switching function interface module in real time. Or, the link information data source can be the control module, and the control module saves the link information per se at the same time when sending the link establishment/deletion/modification message to the active switching function interface module and the standby switching function interface module, namely, the control module itself saves the same link information with the active switching function interface module.

In addition, the network element system of the present invention can be the network element system RNC in the 3G network, then the AAL2 signaling control protocol resident board is used as the control module, and the active Iub interface board and the standby Iub interface board are separately used as the active switching function interface module and the standby switching function interface module. It is worth noting that the present invention is suitable for the synchronization and detection between the active and standby interface modules of any network element system which is needed to perform the active and standby switching function, but is not limited to be applied in the network element system RNC.

Compared with the network element system in the 3G network that is known, the present invention can effectively perform the synchronization and consistent detection of the link information by means of synchronizing and detecting the link information between the active switching function interface module and the standby switching function interface module, thereby being able to correctly switch the data on the active switching function interface module to the link of the standby switching function interface module when the active switching function interface module is required to perform the active and standby switching due to problems such as the failure and so on. As the consistency of the link information of the active switching function interface module and the standby switching function interface module is maintained, operations such as the replacement, and the upgrade of software and hardware and the like can be performed for anyone of the active switching function interface module and the standby switching function interface module, while the another one can still support the service of the on-line users and the access of the new users. In addition, since the synchronization and detection are completed within one procedure, the operation procedure is simplified and the system load is reduced.

Further, the consistency of the link information between the active switching function interface module and the standby switching function interface module can be implemented in real time and more effectively by means of distinguishingly performing the processing in the procedure of synchronizing and detecting the link information in real time according to the messages from the control module, and it can be prevented that the old link information replaces the new link information.

Besides, adding the synchronization serial number and the message serial number to the message interacted between the active switching function interface module and the standby switching function interface module can further prevent the disorder from occurring in the procedure of synchronizing and detecting the link information, and further avoid the occurrence of the case that the new link information replaces the old link information.

The above description is just the preferred examples of the present invention, it should pointed out that, the person having ordinary skill in the art can make various improvements and embellishments without departing from the principle of the present invention, and these improvements and embellishments shall all fall into the protection scope of the present invention.

What is claimed is:

1. An active and standby switching interface module, which is located in a network element system, the network element system further comprising a control module, the active and standby switching interface module comprising an active switching interface module and a standby switching interface module, wherein the active switching interface module comprises a first processing unit configured to, when the active and standby switching interface module is used as an active switching function interface module, directly establish/delete/modify link information according to a link establishment/deletion/modification message that is received from the control module;

the standby switching interface module comprises a second processing unit configured to, when the active and standby switching interface module is used as a standby switching function interface module, send a synchronization detection request message to a synchronization module, perform synchronization processing on the link information on the standby interface module according to a synchronization detection reply message from the synchronization module, and determine whether to establish/delete/modify the link information on the standby interface module according to a synchronization detection state of the link information on the standby interface module and a type of a received message from the control module, wherein the synchronization detection reply message encapsulates the link information on the active switching function interface module, and the synchronization module is the control module and the control module comprises a memory to save link information same with the link information in the active switching function interface module;

wherein, the second processing unit of the standby interface module is configured to determine whether to establish/delete/modify the link information on the standby interface module according to a synchronization detection state of the link information on the standby interface module and a type of a received message from the control module in the following way:

if the message received from the control module is a link establishment message, directly establish new link information according to the link establishment message, and not process the newly established link information when receiving the synchronization detection reply message of the active switching function interface module;

if the message received from the control module is a link deletion/modification message, judge whether the link message to be deleted or modified has passed synchronization detection or not, if yes, delete/modify the link information according to the link deletion/modification message, otherwise, cache the link deletion/modification message into a message queue, and after the synchronization detection of the link information is completed, delete/modify the link information according to the link deletion/modification message if the link information included in the link deletion/modification message cached in the message queue has passed synchronization detection.

2. The active and standby switching interface module according to claim 1, wherein the first processing unit of the active interface module is configured to:

generate a synchronization detection reply message according to the synchronization detection request message received from the standby switching function interface module, and send the synchronization detection reply message to the standby switching function interface module, wherein the synchronization detection reply message encapsulates the link information on the active interface module.

3. The active and standby switching interface module according to claim 2, wherein the first processing unit of the active interface module is further configured to:

directly establish/delete/modify the link information according to the link establishment/deletion/modification message that is received.

4. The active and standby switching interface module according to claim 2, wherein the second processing unit of the standby interface module is configured to:

send the synchronization detection request message to the synchronization module; and perform the synchronization processing on the link information on the standby interface module according to the synchronization detection reply message from the synchronization module.

5. The active and standby switching interface module according to claim 1, wherein the second processing unit of the standby interface module is configured to:

send the synchronization detection request message to the synchronization module; and perform the synchronization processing on the link information on the standby interface module according to the synchronization detection reply message from the synchronization module.

6. The active and standby switching interface module according to claim 5, wherein, the second processing unit of the standby interface module is further configured to:
  delete the link information that is not synchronized and detected on the standby interface module; or,
  generate a synchronization detection acknowledgement message and send the synchronization detection acknowledgement message to the synchronization module after receiving the synchronization detection reply message.

7. The active and standby switching interface module according to claim 1, wherein a message interacted between the standby interface module and the synchronization module includes a synchronization serial number and a message serial number,
  wherein when any one of the synchronization serial number and the message serial number included in the message received from the synchronization module is not an expected serial number, the standby interface module does not process the message, and waits for the synchronization module resending the message; or, the standby interface module resends a message including an expected synchronization serial number and message serial number to the synchronization module.

8. A network element system, comprising: a control module, one active switching function interface module comprising a first processing unit and at least one standby switching function interface module comprising a second processing unit, wherein
  the second processing unit of the standby switching function interface module to send a synchronization detection request message to the control module, and perform synchronization processing on link information on the standby switching function interface module according to a synchronization detection reply message from the control module, wherein the synchronization detection reply message encapsulates the link information on the active switching function interface module, and the control module saves link information same with the active switching function interface module;
  the second processing unit of the standby switching function interface module is further configured to: determine whether to establish/delete/modify the link information on the standby switching function interface module according to a synchronization detection state of the link information on the standby switching function interface module and a type of a received message from the control module, that is,
  if the message received from the control module is a link establishment message, directly establish new link information according to the link establishment message, and not process the newly established link information when receiving the synchronization detection reply message of the active switching function interface module;
  if the message received from the control module is a link deletion/modification message, judge whether the link message to be deleted or modified has passed synchronization detection or not, if yes, delete/modify the link information according to the link deletion/modification message, otherwise, cache the link deletion/modification message into a message queue, and after the synchronization detection of the link information is completed, delete/modify the link information according to the link deletion/modification message if the link information included in the link deletion/modification message cached in the message queue has passed synchronization detection.

9. The network element system according to claim 8, wherein
  the control module to send a link establishment/deletion/modification message to the active switching function interface module and the standby switching function interface module;
  the first processing unit of the active switching function interface module is further configured to: directly establish/delete/modify the link information according to the link establishment/deletion/modification message that is received;
  the second processing unit of the standby switching function interface module is further configured to: determine whether to establish/delete/modify the link information according to a type of a message received from the control module and a synchronization detection state of the link information on the standby switching function interface module.

10. The network element system according to claim 8, wherein the second processing unit of the standby switching function interface module is further configured to:
  generate a synchronization detection acknowledgement message and send the synchronization detection acknowledgement message to the control module after receiving the synchronization detection reply message; or
  delete the link information that is not synchronized and detected on the standby switching function interface module; or
  a message interacted with the control module includes a synchronization serial number and a message serial number, wherein when any one of the synchronization serial number and the message serial number included in the message received from the control module is not an expected serial number, the standby switching function interface module does not process the message, and waits for the control module resending the message; or, the standby switching function interface module resends a message including an expected synchronization serial number and message serial number to the control module.

11. The network element system according to claim 9, wherein the second processing unit of the standby switching function interface module is further configured to:
  generate a synchronization detection acknowledgement message and send the synchronization detection acknowledgement message to the control module after receiving the synchronization detection reply message; or
  delete the link information that is not synchronized and detected on the standby switching function interface module; or
  a message interacted with the control module includes a synchronization serial number and a message serial number, wherein when any one of the synchronization serial number and the message serial number included in the message received from the control module is not an expected serial number, the standby switching function interface module does not process the message, and waits for the control module resending the message; or, the standby switching function interface module resends a message including an expected synchronization serial number and message serial number to the control module.

12. A method for synchronizing and detecting link information, which is used for a standby switching function interface module in a network element system synchronizing and detecting the link information, the network element system comprising a control module, an active switching function interface module and the standby switching function interface module and the method comprising:

sending a synchronization detection request message to the control module by the standby switching function interface module, and performing synchronization processing on link information on the standby switching function interface module according to a synchronization detection reply message from the control module, wherein the synchronization detection reply message encapsulates the link information on an active switching function interface module, and the control module saves link information same with the active switching function interface module;

sending a link establishment/deletion/modification message to the standby switching function interface module by the control module;

determining whether to establish/delete/modify the link information according to a type of a message from the control module and a synchronization detection state of the link information on the standby switching function interface module by the standby switching function interface module in the following way:

if the message received from the control module is a link establishment message, directly establishing new link information according to the link establishment message, and not processing the newly established link information when receiving the synchronization detection reply message of the active switching function interface module;

if the message received from the control module is a link deletion/modification message, judging whether the link message to be deleted or modified has passed synchronization detection or not, if yes, deleting/modifying the link information according to the link deletion/modification message, otherwise, caching the link deletion/modification message into a message queue, and after the synchronization detection of the link information is completed, deleting/modifying the link information according to the link deletion/modification message if the link information included in the link deletion/modification message cached in the message queue has passed synchronization detection.

13. The method according to claim 12, after performing the synchronization processing on the link information on the standby switching function interface module according to the synchronization detection reply message, further comprising:

deleting the link information that is not synchronized and detected on the standby switching function interface module by the standby switching function interface module; or, generating a synchronization detection acknowledgement message and sending the synchronization detection acknowledgement message to the control module by the standby switching function interface module.

14. The method according to claim 12, further comprising:

sending a link establishment/deletion/modification message to the active switching function interface module by the control module;

directly establishing/deleting/modifying the link information according to the link establishment/deletion/modification message that is received by the active switching function interface module.

15. The method according to claim 14, wherein the step of determining whether to establish/delete/modify the link information according to the type of the message from the control module and the synchronization detection state of the link information on the standby switching function interface module comprises:

if the message received from the control module is a link establishment message, directly establishing new link information according to the link establishment message by the standby switching function interface module, and marking the established new link information as a newly established link information, and when the standby switching function interface module receives the synchronization detection reply message, not processing the newly established link information; or, if the message received from the control module is a link deletion/modification message, judging whether the link message to be deleted or modified has been synchronized and detected by the standby switching function interface module, if the link message to be deleted or modified has been synchronized and detected, then deleting or modifying the link information, otherwise, the standby switching function interface module caching the link deletion/modification message into a message queue, and after completing to synchronize and detect link information, if the link information included in the link deletion/modification message cached in the message queue is the link information that has been synchronized and detected, then deleting and modifying the link information.

16. The method according to claim 12, further comprising:
a message interacted between the standby switching function interface module and the control module including a synchronization serial number and a message serial number, wherein when any one of the synchronization serial number and the message serial number included in the message that is received is not an expected serial number, not process the message by the standby switching function interface module, and wait for the control module resending the message; or, resend a message including an expected synchronization serial number and message serial number to the control module by the standby switching function interface module.

* * * * *